United States Patent [19]
Laborie et al.

[11] Patent Number: 5,351,476
[45] Date of Patent: Oct. 4, 1994

[54] NACELLE COOLING AND VENTILATION SYSTEM

[75] Inventors: Daniel Jean-Louis Laborie, Cincinnati; Joseph R. Marban, Springdale; Wallace M. Schulze; Robert J. Baumbick, both of West Chester, all of Ohio

[73] Assignee: General Electric Company, Cincinnati, Ohio

[21] Appl. No.: 49,099

[22] Filed: Apr. 14, 1993

Related U.S. Application Data

[62] Division of Ser. No. 700,975, May 16, 1991, Pat. No. 5,284,012.

[51] Int. Cl.$^5$ ................................. F02C 6/18
[52] U.S. Cl. ........................ 60/39.07; 60/39.83; 60/269
[58] Field of Search ............ 60/39.08, 39.091, 39.83, 60/39.07, 269; 184/6.11

[56] References Cited

U.S. PATENT DOCUMENTS

| | | | |
|---|---|---|---|
| 2,352,790 | 3/1941 | Jordan | 244/130 |
| 2,479,573 | 8/1949 | Howard | 60/41 |
| 2,548,794 | 4/1951 | Hotz et al. | 60/35.6 |
| 2,613,501 | 10/1952 | Price | 60/39.08 |
| 2,672,013 | 3/1954 | Lundquist | 60/39.66 |
| 2,696,712 | 12/1954 | Lewis | 60/39.33 |
| 4,203,566 | 5/1980 | Lord | 244/53 B |
| 4,250,703 | 2/1981 | Norris et al. | 244/53 B |
| 4,271,666 | 6/1981 | Hurley et al. | 60/226 R |
| 4,351,150 | 9/1982 | Schulze | 60/226 R |
| 4,493,184 | 1/1985 | Nikkanen et al. | 60/39.07 |
| 4,566,270 | 1/1986 | Ballard et al. | 60/269 |
| 4,773,212 | 9/1988 | Griffin et al. | 60/39.08 |
| 4,782,658 | 11/1988 | Perry | 60/39.08 |
| 4,815,281 | 3/1989 | Gely | 60/226.1 |
| 4,825,644 | 5/1989 | Bubello et al. | 60/39.091 |
| 5,054,281 | 10/1991 | Mutch | 60/39.07 |

FOREIGN PATENT DOCUMENTS

2164706A 3/1986 United Kingdom.
2204642A 11/1988 United Kingdom.

*Primary Examiner*—Richard A. Bertsch
*Assistant Examiner*—Michael I. Kocharov
*Attorney, Agent, or Firm*—Jerome C. Squillaro; John R. Rafter

[57] ABSTRACT

A nacelle cooling and ventilation system for an aircraft gas turbine engine which includes a chin scoop and duct assembly for directing air through the engine bay where it is exhausted into the engine exhaust through an exhaust shroud eductor. The nacelle is enclosed so that effectively all of the cooling air entering the bay leaves the bay through the engine exhaust and is not dumped overboard, thereby adding to the effective thrust of the engine. An engine oil and generator oil heat exchanger is positioned in the cooling air duct into the bay so that the same air which cools the bay also cools engine and generator oil. The oil heat exchanger includes directional louvers which regulate and keep to a minimum the amount of cooling air and direct cooling air forwardly in the bay so that the entire bay area is cooled, and which can be shut as a fire control measure. The nacelle includes bay vent doors which are opened in response to a high oil temperature condition or in an engine shut-off condition on ground to provide auxiliary air flow from the bay. The doors are positionable by an actuator but can be disconnected from the actuator to pivot freely in response to a sudden increase in nacelle bay pressure.

15 Claims, 7 Drawing Sheets

NACELLE COOLING AND VENTILATION SYSTEM

This application is a division, of application Ser. No. 07/700,975, filed May 16, 1991 now U.S. Pat. No. 5,284,012.

BACKGROUND OF THE INVENTION

The present invention relates to nacelle designs for aircraft gas turbine engines and, more particularly, to a nacelle cooling and ventilation system.

As a result of the high temperatures generated within the engine bay of a nacelle housing a gas turbine engine, it is necessary to pass significant amounts of cooling air through the bay to maintain the components within acceptable temperatures and to meet industry standard fire safety criteria. Further, the lubricating oil for the propeller gear box and generator requires a cooling system. Typically, cooling air is supplied through inlets in the nacelle housing into the engine bay and the stream of exhaust air from the engine induces the cooling air from the bay, and mixes it with the exhaust stream. Propeller gear box and generator lubricating oils are cooled in air/oil heat exchangers which receive air from a scoop separate from the engine intake scoop, and release air overboard.

An example of a nacelle cooling system is disclosed in Hotz et al. U.S. Pat. No. 2,548,794. That patent discloses a nacelle in which the twin generators of a twin engine nacelle are connected to receive cooling air from a duct which is separate from the engine inlet duct. An exhaust duct conveys the cooling air from the generators to the exhaust area of the nacelle which is aft of the engine bay so that the exhaust stream from the engines draws air through the generator.

In the Hotz et al. design, the engine bay itself is cooled by entry of air through vents formed in the sides of the nacelle. Air is drawn in through those vents and is passed through the bay and into the inlet air to the engines. Disadvantage with such a design are: (1) any flammable fluid leakage in the engine bay might be carried into the engine inlet with a concurrent fire safety risk, and (2) air drawn in through the side vents decreases the overall efficiency of the engine in developing thrust and reduces the overall aerodynamic efficiency of the nacelle.

Accordingly, there is a need for a nacelle for a gas turbine engine in which both lubricating oil and the engine bay are cooled with external air passed through the bay with minimum reductions in aerodynamic efficiency and in the amount of thrust developed by the engine.

SUMMARY OF THE INVENTION

The present invention is a nacelle cooling and ventilation system in which air enters the engine bay through a single nacelle opening and is used to cool oils in the generator and propeller gear box to ventilate the engine bay. The air entering the engine bay is used for cooling and ventilating the nacelle compartment, thereby eliminating the need for additional louvers or vents in the nacelle during normal operation. Further, the air is exhausted through an engine exhaust eductor at the engine bay exit. The advantage of this system is that, by maintaining the openings in the nacelle to a minimum, losses in thrust resulting from cooling the engine or oil systems is maintained at a minimum and all cooling air passes into the exhaust stream of the turbine engine where it contributes to thrust.

In a preferred embodiment, the system includes the start bleed flow in which pressurized air is ducted to an auxiliary ejector which supplements the engine exhaust educator at the engine bay exit, rather than being dumped overboard as in prior art systems. This auxiliary ejector helps provide adequate air flow through the nacelle at low aircraft speeds such as at ground runs or taxiing. Also in the preferred embodiment, the nacelle includes two engine bay vent doors with actuators that open them in the event that the oil temperature exceeds a predetermined limit, thereby increasing airflow through the oil coolers and the engine bay. Further, the actuator is connected such that the doors are open to allow natural ventilation when the engine is shut down on the ground. The doors are configured to disconnect the actuator an pivot freely at a predetermined pressure differential across the doors so that excessive engine bay pressure, as from an open bleed air duct, can escape through these vent openings thereby eliminating the need of separate blow-out doors.

In another aspect of the preferred embodiment, the propeller gear box and generator oil heat exchangers are combined in a single unit which receives cooling air from a single opening. A thermostatically controlled set of louvers is mounted on the heat exchangers and the louvers are oriented to direct air forwardly into the nacelle so that all components of the turbine engine and propeller gear box have cooling air flowing over them before the air is drawn rearwardly to the exhaust educator. The thermostat incorporated into the air/oil heat exchanger opens the louvers to their fullest extent at a predetermined maximum temperature, and closes the louvers to a minimum when oil temperature falls below a predetermined minimum. If an engine bay fire occurs, an aircraft control solenoid disconnects the control thermostat at engine shut down and the louvers shut completely to minimize air flow and to reduce the amount of fire extinguishing agent required.

Accordingly, it is an object of the present invention to provide a cooling and ventilation system for a gas turbine nacelle which minimizes the number of air inlet openings and air exhaust opening so that all exhausting air is dumped into the engine exhaust to promote high thrust efficiency; a cooling and ventilation system in which start bleed air is utilized to draw cooling air through the nacelle at low aircraft speed conditions; a cooling and ventilation system in which an air/oil heat exchanger includes louvers that distribute air throughout the engine bay of the nacelle or shut air flow down in low temperature or fire conditions; a cooling and ventilation system which includes auxiliary vent doors which open only under conditions of high propeller gear box oil temperature or of engine shut-down on ground situations and act as pressure relief doors; and a cooling and ventilation system which is reliable, safe, which simplifies nacelle construction, is easy to maintain and is relatively inexpensive to implement.

Other objects and advantages of the present invention will be apparent from the following description, the accompanying drawings and the appended claims.

DETAILED DESCRIPTION

Figure 1:
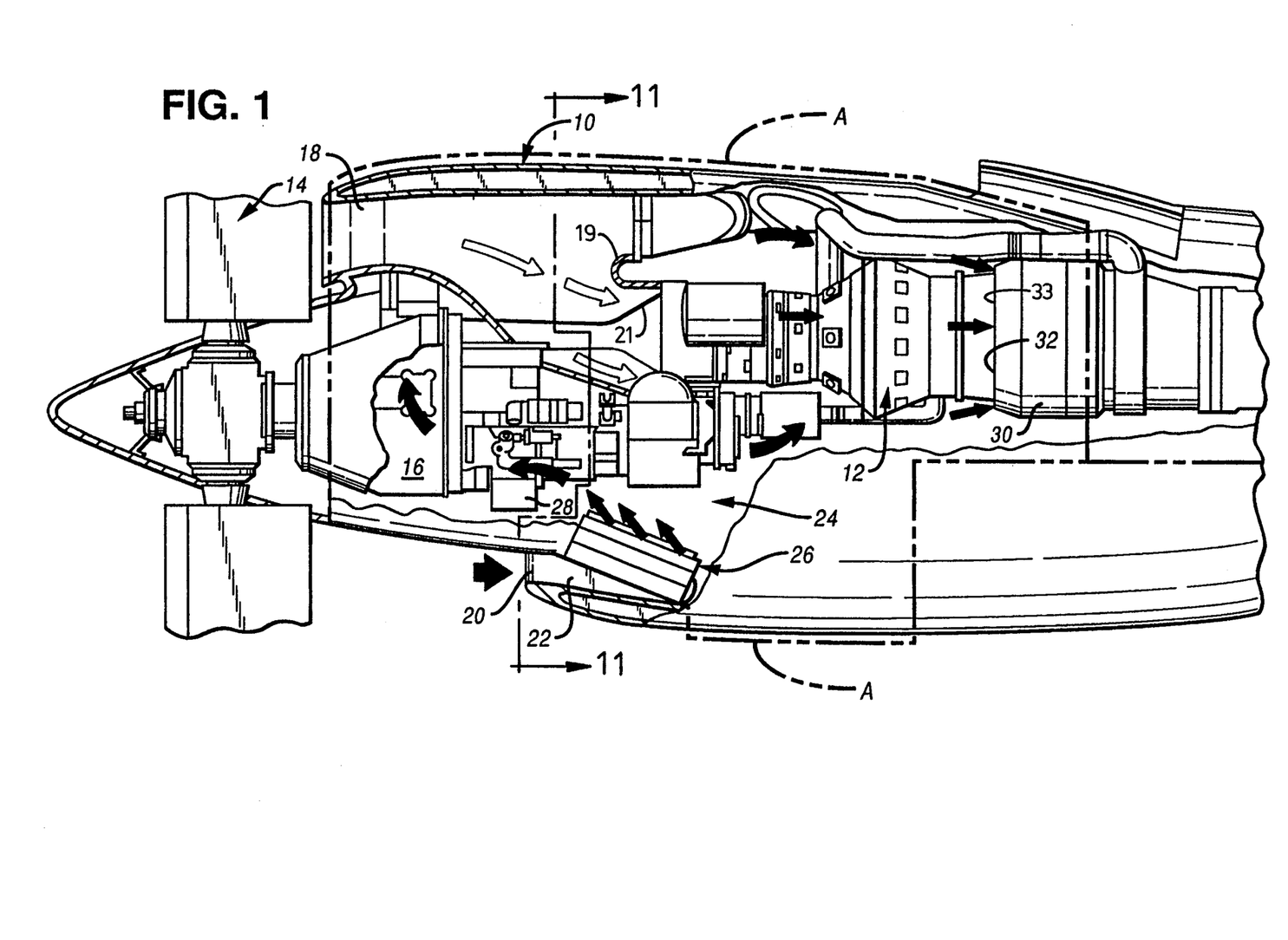
FIG. 1 is a somewhat schematic side elevation of a nacelle incorporating the preferred embodiment of the present invention, partially broken away to reveal the engine bay.

As shown in FIG. 1, the nacelle of the present invention, generally designated 10, houses a gas turbine engine 12 which drives a propeller assembly 14 through a propeller gear box 16. An engine air scoop 18 is positioned above the propeller gear box 16 and conveys air for combustion to the engine 12. A chin scoop 20 is positioned in a lower portion of the nacelle 10 and includes a duct 22 which conveys air to the engine bay 24 of the nacelle 10. The engine bay 24 is designated fire zone A.

An air/oil heat exchanger assembly, generally designated 26 (also called an oil cooler), is positioned within the duct 22 and is in fluid communication with the lubricating oil of the propeller gear box 16 and generator 28. The engine 12 includes an exhaust shroud 30 which encloses the exhaust conduit 31 of the engine (see FIG. 3) and forms an annular passage 32 which allows air to flow from the bay 24 to the exhaust stream.

Figure 3:
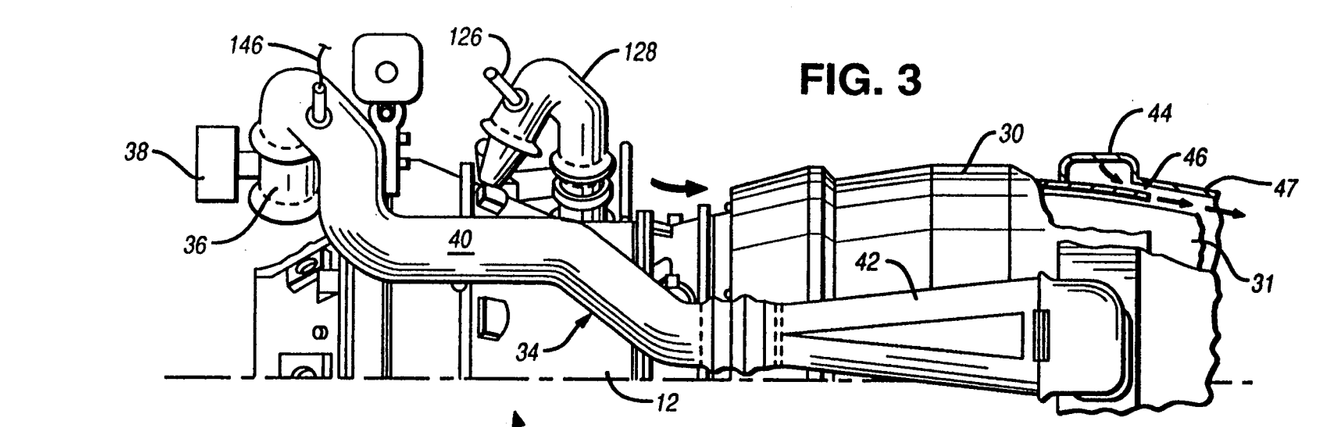
FIG. 3 is a detail showing a top plan view of the gas turbine engine of FIG. 1 in which the auxiliary exhaust eductor is partially broken away.

As shown in FIG. 3, the cooling and ventilation system of the nacelle 10 includes a start-bleed air exhaust assembly, generally designated 34. The start-bleed exhaust assembly 34 includes a conventional control valve 36 and actuator 38 and is connected to a midstage compressor portion of the engine 12 to adjust airflow from the axial compressor to match the centrifugal compressor at low engine speeds. A conduit 40 extends from the valve 36 and is connected to a transition piece 42 which is connected to an annular plenum 44. Annular plenum 44 is attached to and extends about the periphery of the exhaust shroud 30 and includes an annular opening 46 covered by an annular flange 47. The opening 46 which connects the plenum 44 to the exhaust shroud 30, which terminates within the flange 47 so that air flowing into the plenum flows through the annular opening 46 to the space between the shroud and the exhaust duct 31 and from there to the exhaust stream of the engine 12.

Figure 4:
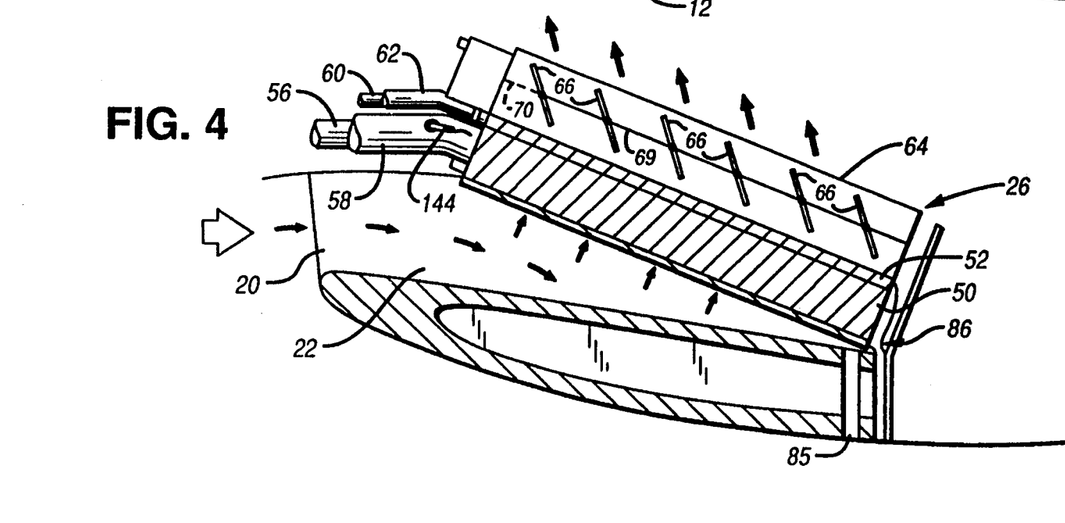
FIG. 4 is a detail schematic showing the air/oil heat exchanger of the nacelle of FIG. 1.
Figure 5:
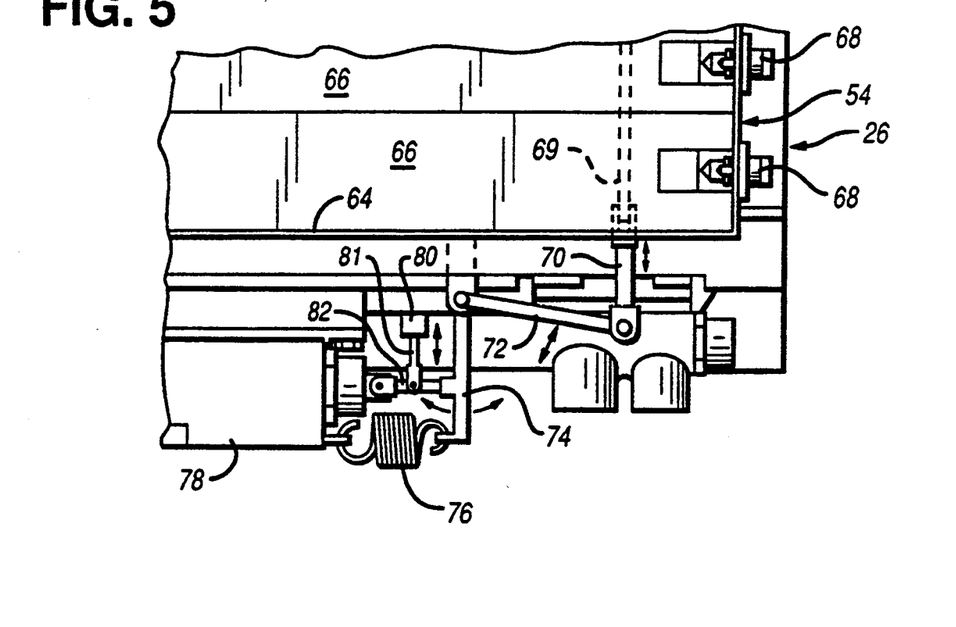
FIG. 5 is a detail showing the louver operation linkage of the heat exchanger of FIG. 4.

As shown in FIGS. 4 and 5, air/oil heat exchanger assembly 26 includes a propeller gear box oil heat exchanger 50, a generator oil heat exchanger 52 and a louver assembly 54. The propeller gear box and generator heat exchangers 50, 52 provide cooling of the lubricating oils utilized in the propeller gear box 16 and generator 28. The heat exchangers 50, 52 preferably each have a folded crossflow configuration and are aluminum plate-fin, air-to-oil units fabricated by brazing and welding. The core matrices of each heat exchanger 50, 52 are a brazed assembly consisting of alternate layers of oil and air fins separated by tubeplates. Double closure bars are integrally brazed to the tubeplates to form the oil and air passages. These double bars on all the passages provide leakage containment for the fluids, avoiding air contamination by the oil.

The oil and air fins (not shown) in the units 50, 52 are made of thin gauge aluminum alloy sheet. The air inlet side of the cooler 26 incorporates a thicker gage fin at the inlet of each cooling air passage to protect the core matrices against foreign objects. As shown in FIG. 4, the propeller gear box heat exchanger 50 includes inlet and outlet lines 56, 58, respectively, connected to the propeller gear box lubrication system (not shown) and the generator heat exchanger 52 includes inlet and outlet lines 60, 62, respectively, connected to the generator lubrication system (not shown).

The louver assembly 54 includes a housing 64 which supports a plurality of louvers 66 for pivotal rotation. Referring to FIG. 5, each louver 66 is connected at its ends by a bearing mount 68 and the entire assembly is positionable in unison by linkage 69 of conventional design which is actuated by displacing an actuator rod 70. The actuator rod 70 is pivotally connected to a link arm 72 which is fixed to an actuator arm 74. The actuator arm 74 is loaded in a clockwise direction in FIG. 5 by return spring 76 and is displaced in a counter-clockwise direction by temperature controlled actuator 78.

Figure 6:
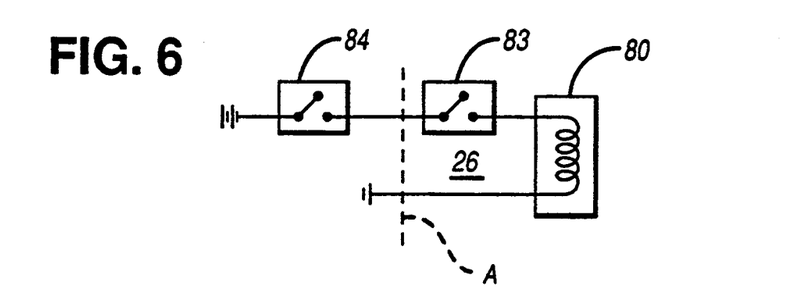
FIG. 6 is an electrical schematic detail of the circuit energizing the fire control solenoid of the present invention.

A fire shut-off solenoid 80 actuates a rod 81 which pivots a connecting pin 82 that extends between the temperature controlled actuator 78 and actuator arm 74. The solenoid 80 is energized by the aircraft power supply and, as shown in FIG. 6, is controlled by propeller gear box low pressure switch 83 (located on line 58) in nacelle 26 and engine fire handle switch 84. Switches 83, 84 are in series and both must be closed to energize solenoid 80.

In the preferred embodiment, the temperature controlled actuator 78 includes a thermostatic organic wax element which expands and contracts to displace the pivot pin 82 sidewardly against the actuator arm 74. Counter-clockwise pivotal motion of the arm 74 causes the rod 70 to be depressed upwardly in FIG. 5 to pivot the louvers to a generally open position as shown in FIG. 4. Conversely, a decrease in temperature causes a sideward movement of the pin 82 allowing the arm 74 to pivot clockwise, thereby moving the rod 70 downwardly in FIG. 5 to close the louvers 66. The actuator 78 is adjusted to position the louvers so that oil temperature in the propeller gear box 16 is maintained below 165° F. and typically between 145° F. and 165° F.

As shown in FIGS. 5 and 6, in the event of a fire emergency, upon closure of propeller gear box oil low pressure switch 83 indicating that the engine has been shut down by the flight crew, and actuation by the flight crew of the engine fire handle 84, the fire shut-off solenoid 80 is energized to draw the rod 82 upwardly in FIG. 5 to pivot pin 84 out of contact with the actuator arm 74. This allows the return spring 76 to draw the arm 74 fully clockwise so that the louvers 66 assume a fully closed configuration. However, in normal operation the louvers 66 are positioned by actuator 78 between a minimum slightly open and at a maximum are open and a maximum of the angle shown in FIG. 4. As shown in FIG. 1, this angular orientation directs air flowing through the chin scoop 20 forwardly within the engine bay 24 to ventilate the part of the nacelle forward of the oil cooler 26. The minimum position is consistent with fire safety criteria of low residency time of flow over engine hot cases.

Further, the oil cooler 26 is positioned at an angle within the duct 22 to prevent packing of the cooler by ice or snow when the associated aircraft is flying in inclement weather. A drain opening 85 is positioned rearwardly of the duct 22 and provides an exit for condensation, other moisture collecting in the duct or dripping from the cooler 26. An oil drain port and tube 86 is connected to discharge oil leakage from the heat exchangers 50, 52 overboard.

Figure 7:
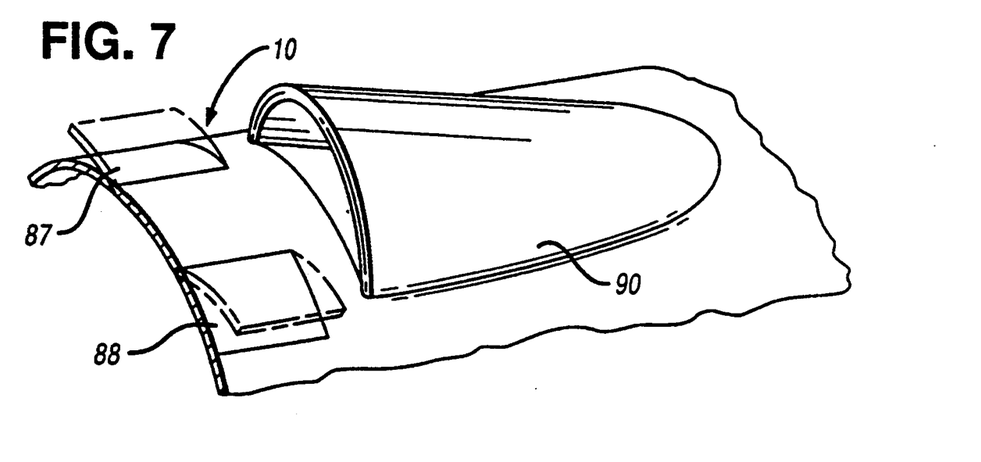
FIG. 7 is a detail showing the position of the bay vent doors of the nacelle of FIG. 1.

As shown in FIG. 7, the cooling and ventilation system includes a pair of bay vent doors 87, 88 which are positioned on the upper surface of the nacelle 10 and forwardly of the infra red suppressor scoop 90. The doors 87, 88 are hinged in a longitudinal direction so that they open laterally.

Figure 8:
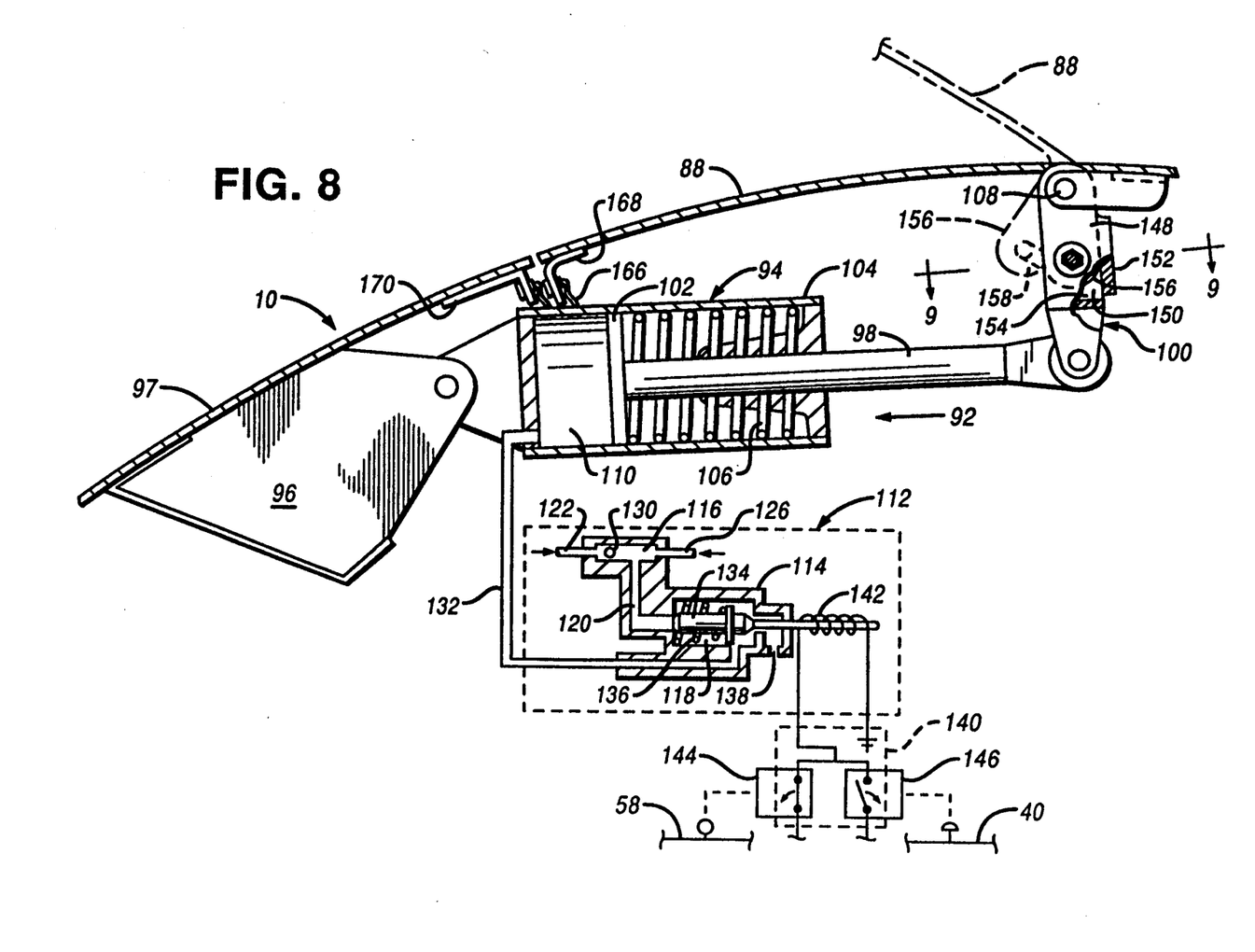
FIG. 8 is a schematic detail of the nacelle of FIG. 1 showing the mechanism operating one of the bay vent doors shown in FIG. 7.
Figure 9:
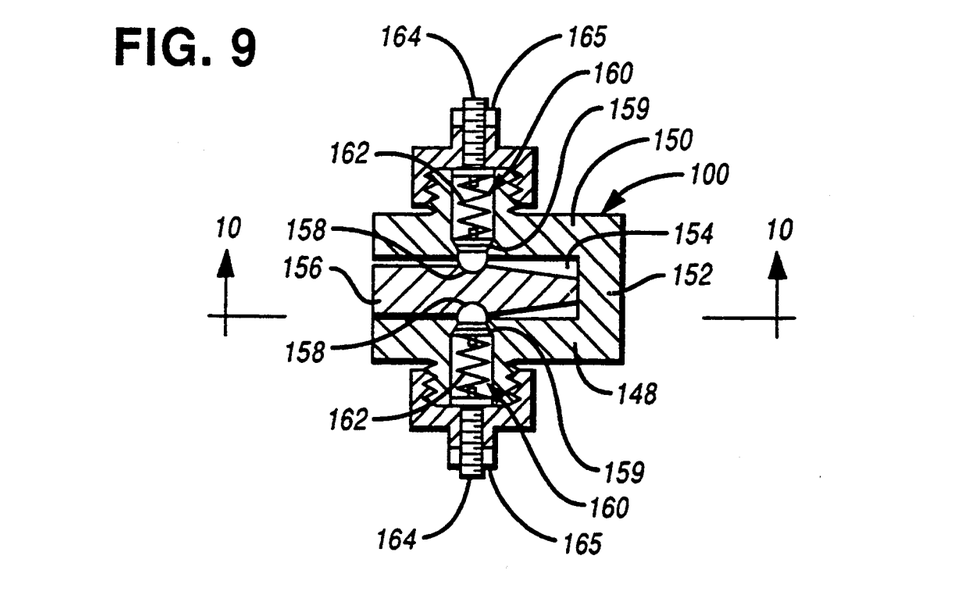
FIG. 9 is a cross section of the bell crank taken at line 9—9 of FIG. 8.
Figure 10:
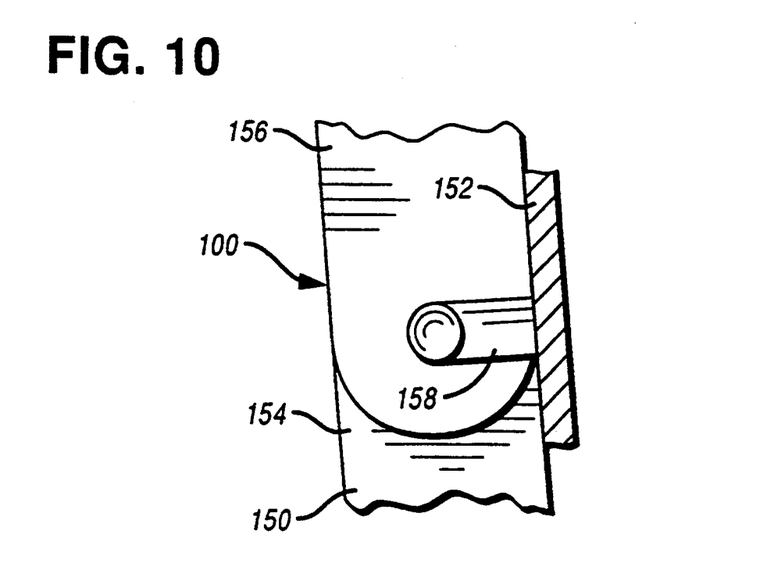
FIG. 10 is a detail cross section taken at line 10—10 of FIG. 9.
Figure 11:
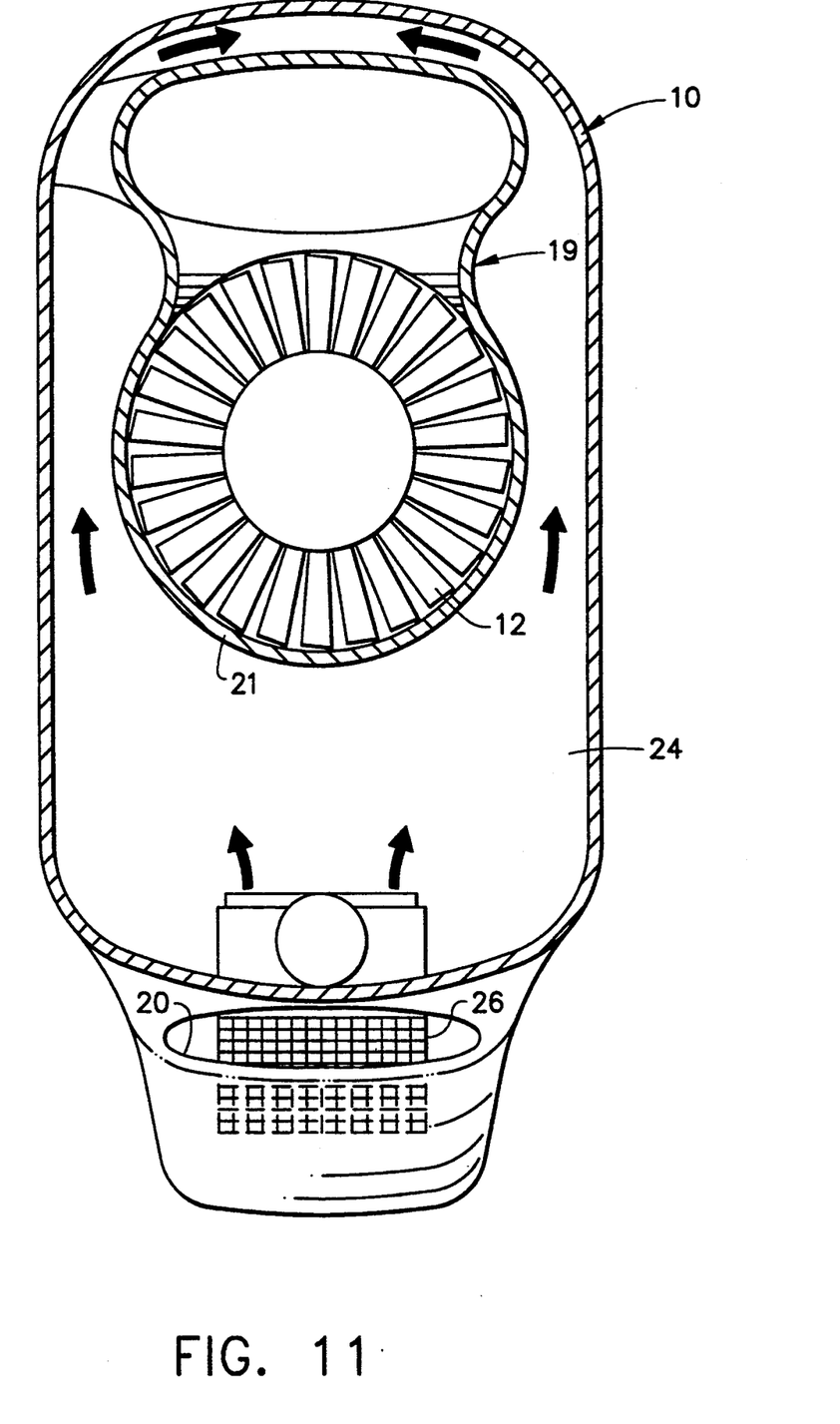
FIG. 11 is a sectional view taken along line 11—11 of FIG. 1 illustrating the relative position of the engine air inlet duct and the chin scoop and heat exchanger.

FIGS. 8, 9 and 10 show the details of the actuation mechanism, generally designated 92, of door 88, it being understood that a similar mechanism is provided for door 87. Actuation mechanism 92 includes an actuator in the form of a cylinder motor 94 pivotally mounted to a bracket 96 attached to the nacelle housing 97. The cylinder motor 94 includes a rod 98 which is pivotally connected to a bell crank 10 and includes a piston 102 within a cylinder 104. The piston 102 is spring biased by an extension spring 106 to travel to the left in FIG. 8, thereby causing the bell crank 100 to pivot clockwise about pivot connection 108 attached to nacelle housing 97.

Figure 2:
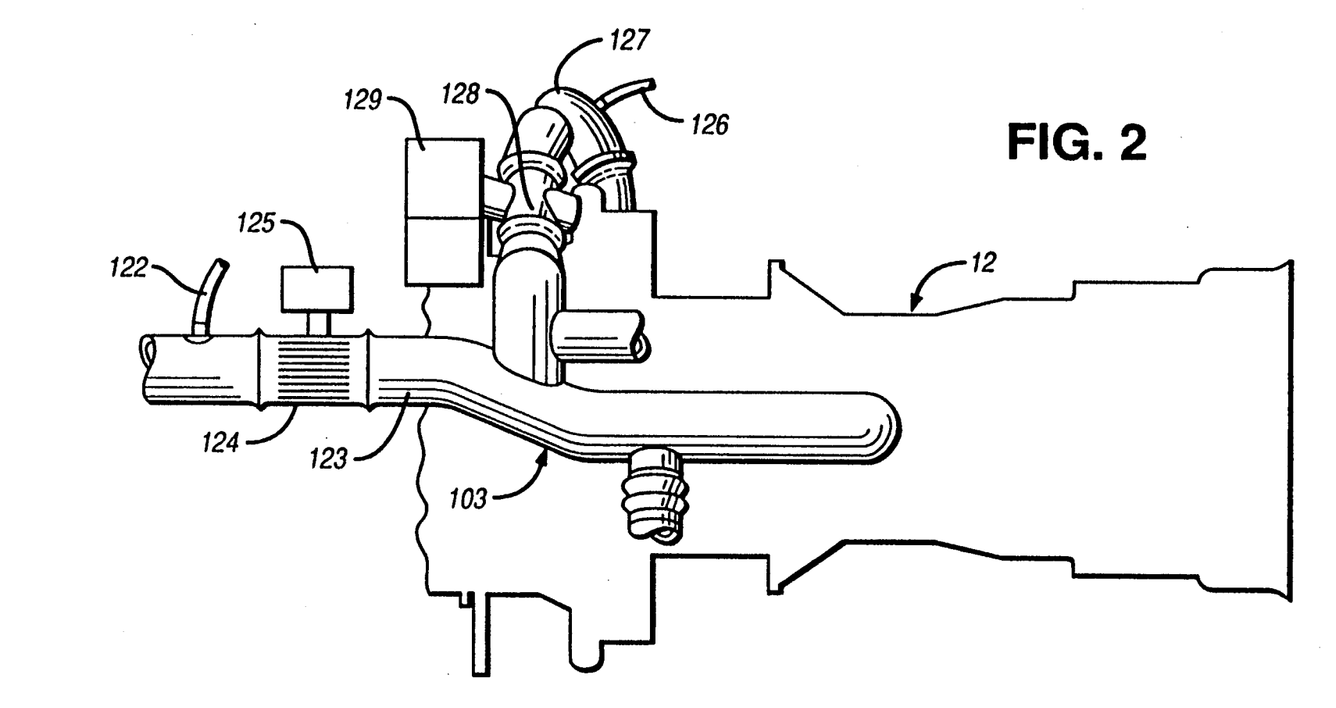
FIG. 2 is a schematic side elevation of the gas turbine engine of FIG. 1, taken from the opposite side of the engine bay.

A chamber 110 in the cylinder 102 is selectively pressurized by air from the engine bleed air system 103 (see FIG. 2) which is supplied through an actuator valve, generally designated 112.

Valve 112 includes a valve body 114 defining an inlet chamber 116 which communicates with a valve chamber 118 by a conduit 120. Inlet chamber 116 is connected to pressure line 122 which supplies pressurized air from the aircraft bleed air duct 123 of bleed air system 103 downstream of shut off value 124 and actuator 125 (see FIG. 2). Conduit 126 in FIG. 8 is connected to inlet chamber 116 and high pressure duct 127 of the bleed air system ducting of the engine 12 in FIG. 2 upstream of high pressure valve 128 and actuator 129.

A spherical shut-off element 130 is captured within the inlet chamber 116. When pressurized air from high pressure component 128, conveyed through conduit 126, enters inlet chamber 116 and is higher in pressure than pressurized air entering through conduit 122 from environmental control system conduit 124, the element 130 is displaced to shut off conduit 122 so that compressed air is directed through passageway 132 to valve chamber 118. Conversely, when the bleed air system 103 is shut down, the pressure through conduit 126 drops and air pressure through conduit 122 from the aircraft bleed system exceeds that entering through conduit 126, the element 130 is displaced to the right in FIG. 8 so that compressed air is directed through passageway 132. Consequently, valve 112 maintains the actuator 92 pressurized and the doors 87, 88 closed when the engine 12 is shut down and the aircraft bleed system is pressurized, thereby reducing installation drag during an in flight shut down condition.

Valve chamber 118 includes a pintle 134 which is biased by spring 136 to the closed position shown in FIG. 7. In this position, air in chamber 110 travels through conduit 120 to be dumped through exit port 138, thereby allowing the spring 106 to displace the cylinder 102 in rod 98 to the left in FIG. 7 to open the door 88.

A control system 140 actuates solenoid 142 to displace the pintle 134 to the right, thereby closing the exit opening 138 and allowing compressed air entering inlet chamber 116 to flow through passageway 132 and conduit 120 into chamber 110, thereby displacing the piston 102 and rod 98 to the right in FIG. 7 to maintain the door 88 in the closed configuration shown. Control system 140 includes normally closed switch 144 and normally open switch 146. Normally closed switch 144 is an oil temperature switch on outlet line 58 of heat exchanger 50 (see also FIG. 4). Switch 144 is set to open when propeller gear box oil temperature exceeds 170° F. In this condition, both switches 144, 146 are open, the solenoid 142 is not energized and the vent door 88 opens since the air in chamber 110 is dumped through exit opening 138 in valve 112.

Switch 146 is normally open and is a pressure switch mounted on duct 40 which closes when the start bleed duct is pressurized. Consequently, the vent doors 87, 88 are not opened at engine idle conditions so that shroud 30 draws air only from chin scoop 20 (see FIG. 1).

The bell crank 100 includes a pair of brackets 148, 150 oriented parallel to each other and connected by cross webbing 152. The brackets 148, 150 are spaced apart sufficiently to form a recess 154 sized to receive the flange 156 connected to the door 88. The flange 156 is connected to pivot 108. The flange 156 includes detent slots 158 on both sides which receive the pins 159 of detents 160 carried in brackets 148, 150. Detent springs 162 are adjusted by screws nut 164 and lock nuts 165 such that the retentive force exerted by the detents 160 are sufficient to maintain the door 88 in a closed position when the pressure differential across the door 88 is below a predetermined value compatible with the structural integrity of the nacelle cowlings.

When the pressure within the bay 24 exceeds this value, the pressure on the door 88 causes the flange 156 to disengage from the detents 160, permitting the door 88 to pivot about pivot 108 to an open configuration. The door 88 is prevented from opening beyond a maximum desired angle by a lanyard 166 which is attached to a door bracket 168 and a bracket 170 on the nacelle housing 97. The flange 156 will not automatically re-engage the crank 100 but will remain partially disengaged to signal to ground crews that a blow out event has occurred in flight.

The operation of the nacelle cooling and ventilating system is as follows. When the engine 12 is at low speeds, or during starting, the start bleed valve 38 is open to pressurize the start bleed duct 40. Switch 146 is closed which actuates valve 112 to close the vent bay doors 87, 88. At this time, the louvers 66 of the oil cooler 26 are in the minimum open position, but some air does flow into bay 34 as a result of the drawing power of the start bleed exhaust assembly 34. As air speed increases and oil temperatures increase, valve 78 opens the louvers 66 such that air entering the chin scoop 20 and traveling through duct 22 is directed into the bay 24 and forward to the propeller gear box area 16, before being drawn rearwardly through the annular opening 32 of the exhaust shroud 30.

The temperature controlled actuator 78 continually positions the louvers 66 to provide sufficient air flow to cool the oil in the heat exchanger 26 for the propeller gear box 16 and generator 28, and modulating air flow through the bay 24 for cooling and ventilating the engine bay 24 of the engine 12. During take off and cruising speeds, the start bleed exhaust assembly is inactive; however, air flow through the chin scoop 20 is sufficient to provide for the cooling needs of the oil lubricating the propeller gear box 16 and generator 28 due to the ram air effect on chin scoop 20 so that the additional drawing force of the start bleed ejector 34 is not required. All cooling air, during both start up and cruising or operational conditions, is vented into the tailpipe exhaust to add to the thrust produced by the engine 12.

At above idle engine speeds, the start bleed valve 36 is closed so that switch 146 is open. Whenever the propeller gear box oil temperature is below its maximum limit, switch 144 is closed which directs pressurized air from the bleed system to pressurize cylinder motor 94 to close the vent bay doors 87, 88. However, should a propeller gear box overtemperature condition exist, switch 144 will open which will de-energize the solenoid 142 to block air flow from the bleed system 103 and, at the same time, allow the air within the cylinder motor 94 to be dumped through the exit opening 138, thereby allowing spring 106 to open the bay vent doors 87, 88. If an overpressure condition occurs within the bay 24, the vent doors 87, 88 open in response to the pressure differential across them and allow for a release of pressure.

While the form of apparatus herein described constitutes a preferred embodiment of this invention, it is to be understood that the invention is not limited to this precise form of apparatus, and that changes may be made therein without departing from the scope of the invention.

What is claimed is:

1. In a nacelle having a turbine engine in a bay thereof, an engine inlet for supplying combustion air to said engine, an exhaust shroud forming an annular passage with an exhaust conduit of said engine for evacuating air from within said engine bay, a chin scoop for receiving cooling air and an air/oil heat exchanger receiving cooling air from said chin scoop, a cooling and ventilation system comprising:
   duct means for discharging air from said heat exchanger into said bay wherein said discharged air cools said engine and is drawn through said annular passage into said engine exhaust, whereby thrust recovery is minimized and overboard dumping of cooling air is minimized;
   a start bleed air conduit extending between a compressor of said turbine and said engine exhaust downstream of said annular passage whereby start bleed compressor air supplements exhaust from said engine to scavenge said bay at low engine exhaust speeds wherein said annular passage includes an entrance adjacent to and in direct fluid flow communication with said bay; and wherein said bay is substantially enclosed by said nacelle wherein effectively all cooling air entering said bay enters from said chin scoop, wherein the cooling air provided for use in said air/oil heat exchanger and for cooling said engine is provided with minimum reductions in aerodynamic efficiency.

2. The system of claim 1 wherein said start bleed air conduit includes an annular manifold extending about or periphery of said exhaust shroud, said manifold having an annular opening connected to discharge bleed air into said engine exhaust, whereby a velocity and mass of exhaust sufficient to draw air through said bay is maintained at low engine speeds.

3. The system of claim 1 wherein said oil cooler includes secondary cooling means.

4. The system of claim 3 wherein said secondary cooling means includes a second heat exchanger, juxtaposed to said heat exchanger, for receiving cooling air from said chin scoop, said second heat exchanger being in fluid communication with a generator associated with said engine.

5. The system of claim 1 further comprising adjustable vent means for overboard dumping of air from said bay.

6. The system of claim 5 wherein said vent means comprises a pair of chimney vents mounted on an upper surface of said nacelle.

7. The system of claim 5 wherein said vent means includes a vent door pivotally attached to said nacelle; actuator means for pivoting said door between open and closed positions, and solenoid means for positioning said valve means wherein said door is positioned to an open position during engine shutdown conditions, whereby air flow from said chin scoop, through said engine bay and out said vent means is effected.

8. The system of claim 7 wherein said solenoid means is responsive to oil temperature at said heat exchanger, whereby said solenoid means positions said valve means to actuate said actuator means to pivot said vent door to an open position when said oil exceeds a predetermined temperature, and to a closed position when said oil is less than said predetermined temperature.

9. The system of claim 8 wherein said actuator means includes a spring return pneumatic cylinder which pivots said door to a closed position when pressurized.

10. The system of claim 9 wherein said valve means directs pressurized air from said bleed air conduit to said cylinder, whereby said cylinder is pressurized to hold said door to said closed position.

11. The system of claim 10 wherein said valve means receives pressurized air alternatively from either said bleed air conduit or a high pressure bleed from said engine to ensure that said vent door is closed during shut down of said engine in flight to reduce installation drag on said nacelle.

12. The system of claim 11 where said solenoid is connected to be energized, and thereby close said vent door, when start bleed pressure is drawn from said engine.

13. The system of claim 12 wherein said vent door is pivotally mounted on said nacelle and includes a bell crank connecting said vent door to said actuator means, said vent door being pivotal relative to said bell crank and including pressure release means for opening said vent door outwardly in response to a sudden pressure increase in said nacelle bay.

14. The system of claim 13 wherein said vent door includes a flange received by said bell crank, said release means including detent means on said bell crank for releasably engaging said flange in contiguous relation with said bell crank.

15. The system of claim 14 wherein said detent means is adjusted such that said flange is released from engagement with said detent means at a predetermined pressure differential across said vent door.

* * * * *